US012126508B2

(12) United States Patent
Jacob et al.

(10) Patent No.: US 12,126,508 B2
(45) Date of Patent: Oct. 22, 2024

(54) SYSTEM FOR MONITORING AND CONTROLLING A DYNAMIC NETWORK

(71) Applicant: Dubai Electricity & Water Authority PJSC, Dubai (AE)

(72) Inventors: Jacob Jacob, Dubai (AE); Kemal Labbaci, Dubai (AE); Abdullah Saeed Ali Obaidullah Alnuaimi, Dubai (AE)

(73) Assignee: DUBAI ELECTRICITY & WATER AUTHORITY PJSC, Dubai (AE)

( * ) Notice: Subject to any disclaimer, the term of this patent is extended or adjusted under 35 U.S.C. 154(b) by 103 days.

(21) Appl. No.: 17/787,250

(22) PCT Filed: Mar. 1, 2020

(86) PCT No.: PCT/IB2020/051740
§ 371 (c)(1),
(2) Date: Jul. 22, 2022

(87) PCT Pub. No.: WO2021/144619
PCT Pub. Date: Jul. 22, 2021

(65) Prior Publication Data
US 2023/0013006 A1 Jan. 19, 2023

(30) Foreign Application Priority Data
Jan. 14, 2020 (AE) .......................... P6000060/2020

(51) Int. Cl.
*H04L 41/16* (2022.01)
*H04L 41/12* (2022.01)
(Continued)

(52) U.S. Cl.
CPC ............ *H04L 43/065* (2013.01); *H04L 41/12* (2013.01); *H04L 41/16* (2013.01)

(58) Field of Classification Search
None
See application file for complete search history.

(56) References Cited

U.S. PATENT DOCUMENTS

| 6,155,292 A | 12/2000 | Kurata | |
| 7,557,702 B2 * | 7/2009 | Eryurek | G05B 23/027 340/8.1 |

(Continued)

FOREIGN PATENT DOCUMENTS

CN 107612546 * 10/2020

OTHER PUBLICATIONS

CN 107612546 English Language Translation (Year: 2020).*
(Continued)

*Primary Examiner* — Curtis A Kuntz
*Assistant Examiner* — Jerold B Murphy
(74) *Attorney, Agent, or Firm* — Dennemeyer & Associates LLC

(57) ABSTRACT

The invention relates to a system for monitoring and controlling a dynamic network such as an oil, gas, or water pipeline. The system includes a plurality of sensors for measuring aspects of a state of the network with each sensor being associated with a segment of the network and connected to a virtual sensor which accumulates and preprocesses measurements from the sensors for each segment of the network. The system further includes a network topology processor for storing the topology of the network and relating sensors and virtual sensors to segments of the network and neighbouring sensors and virtual sensors in accordance with the topology and a reinforcement learning artificial neural network (ANN) based nonlinear state estimation and predictive control model which uses measurements from the sensors and virtual sensors to model the state of the network and estimate sequential states of the network.

41 Claims, 4 Drawing Sheets

(51) Int. Cl.
*H04L 43/065* (2022.01)
*H04L 43/20* (2022.01)

(56) References Cited

U.S. PATENT DOCUMENTS

| | | | |
|---|---|---|---|
| 7,705,747 | B2 | 4/2010 | Twitchell, Jr. |
| 8,447,706 | B2 | 5/2013 | Schneegal et al. |
| 8,665,101 | B2 | 3/2014 | Solomon |
| 11,015,998 | B2 | 5/2021 | Soda |
| 11,122,345 | B2 * | 9/2021 | Bragg ................... H04L 67/125 |
| 11,774,944 | B2 * | 10/2023 | Cella ...................... G06N 20/00 |
| | | | 700/275 |
| 11,778,573 | B2 * | 10/2023 | Osuna Ibarra ........ H04W 24/02 |
| | | | 370/252 |
| 2002/0124633 | A1 | 9/2002 | Yang |
| 2007/0041333 | A1 | 2/2007 | Twitchell, Jr. |
| 2009/0003306 | A1 | 1/2009 | Plutov et al. |
| 2009/0048831 | A1 | 2/2009 | Van Wagenen |
| 2010/0094788 | A1 | 4/2010 | Schaefer |
| 2010/0205974 | A1 | 8/2010 | Schneegabeta |
| 2012/0007743 | A1 | 1/2012 | Solomon |
| 2016/0013638 | A1 | 1/2016 | Glas et al. |
| 2016/0356665 | A1 * | 12/2016 | Felemban ........... G01M 3/2807 |
| 2019/0018768 | A1 | 1/2019 | Kim et al. |
| 2019/0041830 | A1 | 2/2019 | Yarvis et al. |
| 2020/0401120 | A1 * | 12/2020 | Putman ............ G05B 19/41875 |

OTHER PUBLICATIONS

"Leaks Detection in a Pipeline Using Artificial Neural Networks", Springer-Verlag Berlin Heidelberg, Ignacio Barradas, 2009.
International Search Report issued in connection with Application No. PCT/IB2020/051740 dated Oct. 6, 2020.

* cited by examiner

SYSTEM FOR MONITORING AND CONTROLLING A DYNAMIC NETWORK

FIELD OF THE INVENTION

The invention relates to a system for monitoring and controlling a dynamic network and more specifically, but not exclusively, to a system for monitoring and controlling a physical dynamic network such as an oil, gas, or water pipeline.

BACKGROUND TO THE INVENTION

Physical dynamic networks, and utility networks, pipelines and water reticulation networks specifically, are commonly monitored and controlled electronically. This is typically achieved in real time using a so-called supervisory control and data acquisition (SCADA) system which may include a variety of sensors, controllers, graphical user interfaces, and programmable devices. Such traditional systems rely on solving equations and absolute models to monitor the state of the network. These equations may be used to calculate energy or flow rates at specific points in the network.

Traditionally a Utility Network is monitored and controlled in real-time using industrial automation systems such as a SCADA System, which requires human intelligence and interaction to detect and interpret the prevailing conditions or deviations of the dynamic pipeline network, to further control the subject process. Moreover the pipe network's behavior as a dynamical system and its temporal nature makes it impossible to model the system in a deterministic setting. As the network goes through a set of state changes or transitions over time the manifestation of physical phenomenon identifiable through multivariate sparse states cannot be observed effectively through the automation system.

SCADA systems are usually monitored by trained staff which interpret the feedback from the SCADA system and can control the system based on this. The training and experience of the staff is crucial to identify whether the system is operating normally or abnormally and to determine whether there are any fault conditions which may affect the network. As this relies so heavily on the abilities, training, and experience of staff, it is not possible to use the SCADA system to operate a dynamical system in an automated fashion. Prior art which discloses attempts to address aspects of this problem is described in further detail below.

U.S. Pat. No. 6,155,292 in the name of Sakuji Kurata entitled "Method and a synthetic danger predicting and disaster preventing monitor system in which pipelines laid under the ground or through a structure are employed in their entirety for a synthetic danger predicting alarm sensor" discloses a method and a synthetic danger predicting and disaster preventing monitor system which includes a number of sensors associated with an underground pipeline which are employed to detect potential failures in order to carry out preventative maintenance on an affected portion before further damage might occur. A problem with the approach in this disclosure is that it relies heavily on solving equations in a deterministic fashion which is useful for a linear pipeline but cannot be applied to pipelines which have dynamic characteristics and changing boundary conditions.

U.S. Pat. No. 8,447,706 in the name of Siemens Aktiengesellschaft entitled "Method for computer-aided control and/or regulation using two neural networks wherein the second neural network models a quality function and can be used to control a gas turbine" discloses a method which involves use of a cooperative learning method and artificial neural networks. Two feed-forward networks are linked to one another such that the architecture as a whole meets an optimality criterion and approximates the rewards observed to the expected rewards as an appraiser. In the network in this disclosure, the optimum action in respect of the quality function is modeled by a neural network which supplies the optimum action selection rule for a given control problem. A problem with this disclosure is that the method is specifically used to control a gas turbine which does not assist in monitoring and controlling a physical dynamic network.

U.S. Pat. No. 8,665,101 in the name of Aquarius Spectrum Ltd entitled "System method and device for leak detection and localization in a pipe network" discloses a system for leak detection of a fluid in a pipe network which includes flow meters and vibration detectors adapted to be attached to a pipe at a location in the pipe network. A processor analyzes signals generated by the flow meters and vibration detectors to identify the presence of one or more leaks in the pipe network and detecting and localizing leaks in a pipeline network. The disclosure also provides for a device comprising a flow meter integral with a vibration detector for use in the system of the invention. Again, the system in this disclosure relies on solving equations from the flow and vibration data to detect the leaks in a deterministic fashion, which is not possible in a dynamic system.

U.S. Pat. No. 7,705,747 in the name of Terahop Networks, Inc. entitled "Sensor networks for monitoring pipelines and power lines" discloses a sensor network for monitoring utility power lines which includes a sensor disposed for monitoring utility power lines capable of acquiring data related to the utility power lines and communicating sensor data. It further discloses a first remote sensor interface (RSI) which includes a data communications device capable of receiving the sensor data communicated from the sensor and transmitting data relating to the received sensor data. It further discloses a data communications device capable of receiving the data transmitted by the first RSI and transmitting data related to the sensor data directly or indirectly to a network external to the sensor network. A problem with this disclosure is, again, that it does not provide means of autonomously controlling aspects of the network and focuses specifically on the sensor networks.

None of the above disclosures, separately or collectively, disclose the invention as claimed and described herein.

It is desirable to form neighborhoods or clusters to detect, observe and control the dynamic nature and characteristics of a network. Such include movement within a water column through a constrained space such as the pressurized pipeline. Behavior is exhibited which may be induced or influenced by the morphology as well as the dynamic characteristics, namely the velocity, fluid pressure, density, viscosity, temperatures and oscillations exhibited by the water column. Moreover the physical sensors, detectors, and actuators form neighborhoods based on the operational configuration.

OBJECT OF THE INVENTION

It is accordingly an object of the invention to provide a system for monitoring and controlling a dynamic network which, at least partially, alleviates at least some of the problems associated with the prior art. It is also desirable for such a system to observe and control the dynamic nature and characteristics of a network. Furthermore, such control is achieved through the use of neural networks, particularly learning and trained artificial neural networks.

SUMMARY OF THE INVENTION

In accordance with the invention there is provided a system for monitoring and controlling a dynamic network comprising:
- a plurality of sensors, detectors or similar measurement devices for measuring aspects of a state of the network;
- each sensor being associated with a segment of the network and connected to a virtual sensor which accumulates and preprocesses measurements from the sensors for each segment of the network;
- a network topology processor for storing the topology of the network and relating sensors and virtual sensors to segments of the network and neighboring sensors and virtual sensors in accordance with the topology;
- a reinforcement learning artificial neural network (ANN) based nonlinear state estimation and predictive control model which uses measurements from the sensors and virtual sensors to model the state of the network and estimate sequential states of the network;
- a classifier for classifying conditions of the segments of the network such that the condition of each segment may be monitored;
- wherein preceding measurements from the sensors are temporarily stored and provided to the state estimation and predictive control model as inputs for modeling and estimating sequential states of the network; and
- wherein the ANN uses reinforcement learning to train the artificial neural network based on the difference between the estimated state and the measured state.

The system may include a central controller which receives the measurements from the virtual sensors, stores historical measurements and estimated states, and provides measurements to the classifier and the state estimation and predictive control model.

State of a system is the actual value of physical properties of the system at a time before present and present.

The virtual sensors observe, identify, and learn interrelationships of the measurements from the sensors of the segment which collectively represent a dynamic state of the network segment and behavior of fluid flow across the relevant segment.

The virtual sensors receive and process temporal physical measurements from the sensors such as pressure, flow, temperature, and computes derived measurements such as signal frequency, wavelength, autocorrelation, and signal mode.

The network topology processor computes boundaries and divides the network into segments and determines parameters of the segment such as interconnections, length, number, and type of sensors which exhibit similar observable behavior.

The ANN may be a dynamic ANN with dynamically configurable number of layers and neurons per layer.

The sensors may include actuated sensors which measure the state of an actuator which acts upon the system such that the state estimation and predictive control model learns the effect of the state of the actuator on the state of the network.

The actuators may be controlled by the system and control of the actuator may be based on the estimated states of the network by the state estimation and predictive control model and the desired state of the network.

The system may include a feature extraction element in the form of a recurrent neural network with long short-term memory which uses temporal signals to build abstract profiles and extract repeatable phenomenon from the temporal wave behavior, its frequency elements and ability to propagate.

The system may include one or more preprocessing elements for preprocessing the measurements from the sensors or virtual sensors for use by the state estimation and predictive control model.

The preprocessing elements may normalize the measurements of the sensors or virtual sensors, extract features from measurements and derived measurements, classify the extracted features which is provided to the state estimation model, and/or apply filters or operations to the measurements to provide preprocessed values to the state estimation and predictive control model.

The classifier may include an ANN in the form of a Bayesian neural network for classifying the condition of each portion of the network. The condition may be steady state, transitioning, or abnormal. The contributing factors of an underlying unique behavior that may cause the network to leave the steady state can be identified using the classifier.

The classifier may also validate measurements from adjacent sensors and identify faulty readings.

The system may include a selective activation element which selectively provides and or withholds signals during the learning process. The selective activation element may include synapse which encode winning and/or most successful short-term memory activations into long-term memory.

The selective activation element may be utilized during training of the model to provide or withhold signals such that effective selections, where the estimation error is smallest, are stored such that the effective selections may be made based on the stored values.

The network topology processor stores the topology of the network as a graph. The graph may include vertices, which represent nodes of the network, and edges, representing sections of the network.

The topology processor may include a geographical relation element which relates the nodes and vertices of the network to a physical location thereof. The topology and geographical relation element correlate data structures that hold the spatial data, connectivity, real-time data, computed state space and model information of the network.

The state estimation model may include an anomaly detection element. The anomaly detection element detects measurements or derived measurements which fall outside of the estimated state of the network.

The system may include a fault or state detection element. The fault detection element detects observable measured events which are measured at multiple locations which do not fall within the estimated state of the network and classifies the event as a fault. The fault detection element may also detect measurements which correspond to a predefined fault condition. A predefined fault condition may be water hammer, leak, and/or implosion in a section of the network.

The fault detection element may include a feature extraction element and a classifier. The fault detection element may include a long short-term memory (LSTM) ANN which learns and extracts features across time steps in a window to detect faults which have a temporal aspect.

The fault detection element may include an input LSTM layer, multiple hidden layers, and output layer with softmax activation.

The fault detection element may include a geographical locating element, which uses the topological processor and the geographical relation element to locate the origin of the fault in the network. The geographical locating element may use the geographical relation element, wave parameters, and triangulation to determine the physical location of the origin of the fault.

The system may include a graphical interface which shows the sections and nodes of the network schematically or to scale. The graphical interface may indicate the condition of each section of the network. The graphical interface may also indicate the type and location of a fault. The fault may be located based on the relative position of detection of specific features and the distance between detected features based on the network topology.

The network may be a pipeline network. The network may be a water reticulation network.

The sensors may include flow sensor, pressure sensors, temperature sensors, acoustic sensors, turbidity, pH, Oxidation Reduction Potential (ORP), and/or chlorine sensors.

An actuator may be a valve, wherein the sensor measures the operational position of the valve. An actuator may be a pump, wherein the sensor measure measures the operational level of the pump.

BRIEF DESCRIPTION OF THE DRAWINGS

An embodiment of the invention is described below, by way of a non-limiting example only, and with reference to the accompanying drawing in which.

DETAILED DESCRIPTION

Figure 1:
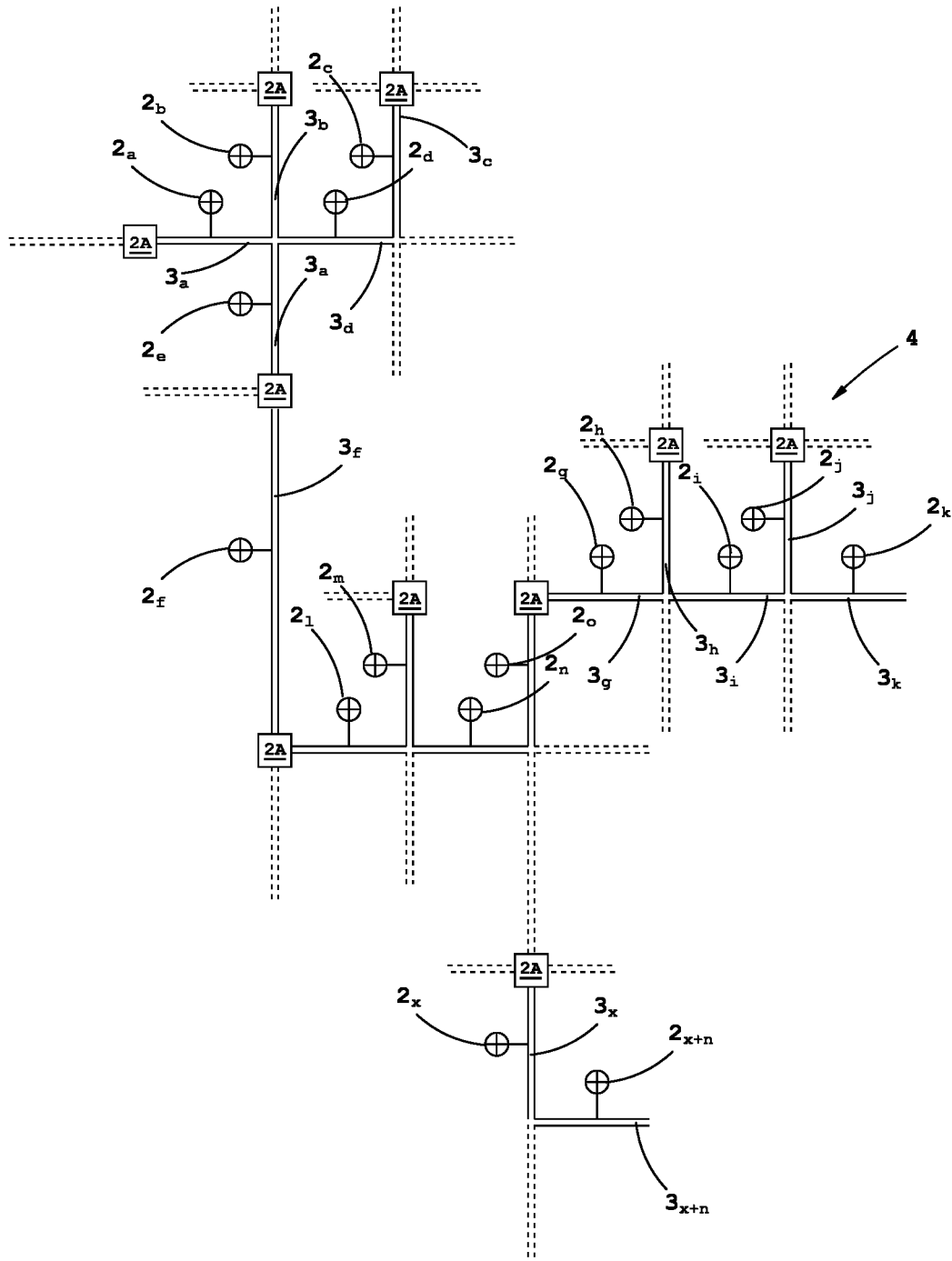
FIG. 1 is a schematic representation of a network.

With reference to the drawings, in which like features are indicated by like numerals, a system for monitoring and controlling a dynamic network is generally indicated by reference numeral 1.

The system 1 described herein uses active temporal intelligence to learn the behavior of a physical dynamic network (such as an oil, gas, or water pipeline). The system includes a plurality of sensors 2 for measuring aspects of a state of the network 4. The measured aspect are physical properties and temporal signals of an inherently dynamical system and computes the relationship between signals from sensors 2 through deep learning and detects steady state changes and transients in the network 4. It should be noted that the network described in this embodiment is focused on a water reticulation network 4 and, as such, the description will refer to sensors 2 and actuators 5 which are typically used in such a network 4. Those skilled in the art will appreciate that the embodiment may be suitably modified, with the necessary changes to sensors, actuators, and layout, and be applied to a wide variety of dynamic physical networks. FIG. 1 shows a portion of a very basic network which has been simplified to assist in the description of the example embodiment herein. However, the embodiment will provide sufficient context and information for the skilled person to apply it to much more complicated systems.

Each sensor 2 is associated with a segment 3 of the network and forms part of a virtual sensor which accumulates and preprocesses measurements from the sensors for each segment 3 of the network 4. In this example, the sensors shown in FIG. 1 are virtual sensors 2. Each virtual sensor 2 represents the collective measurements from primary sensors or transducers of a section 3 of the network 4. The notation used herein associated the virtual sensors 2 sections 3 by its annotated value (for example, sensor $2_a$ represents the collective measurements for section $3_a$, sensor $2_b$ for section $3_b$ and so on up to sensor $2_{x+n}$ representing section $3_{x+n}$). These virtual sensors acquire measurements from several sensors or transducers (indicated collectively by reference numeral $2_z$ in FIG. 2). For example, virtual sensor $2_a$ (which is the virtual sensor for section $3_a$) may receive measurements from transducers $2_{zi}$ and $2_{zii}$ whilst virtual sensor $2_b$ will only receive measurements from transducer $2_{ziii}$. The transducers $2_z$ may include one or more of the following types of sensors $2_z$ placed at multiple locations along the relevant section 3:

flow sensors,
pressure sensors,
temperature sensors,
acoustic or sensors,
turbidity sensors,
pH sensors,
Oxidation Reduction Potential (ORP) sensors, and/or
chlorine sensors.

Such sensors are typically applicable where a water pipeline or reticulation network is monitored by the system 1 but may include many other types which might be useful in this application or other applications. In addition to receiving the raw measurements from the transducers $2_z$, the virtual sensors 2 accumulates and preprocesses measurements such that the measurements from multiple sources with differing types of transducers $2_z$ and measurements may be interpreted in a meaningful way. The virtual sensors 2 receive and process temporal physical measurements from the sensors $2_z$ such as pressure, flow, temperature, and computes derived measurements such as signal frequency, wavelength, autocorrelation, and signal mode. All physical and derived measurements may be preprocessed and used by the system 1, the virtual sensors 2 directly, or through the central controller 8 (described in further detail below). The virtual sensors 2 observe, identify, and learn inter-relationships of the measurements from the transducers 2 of a segment 3 which collectively represent a dynamic state of the network 4 segment 3 and behavior of fluid flow across the relevant segment 3.

Figure 2:
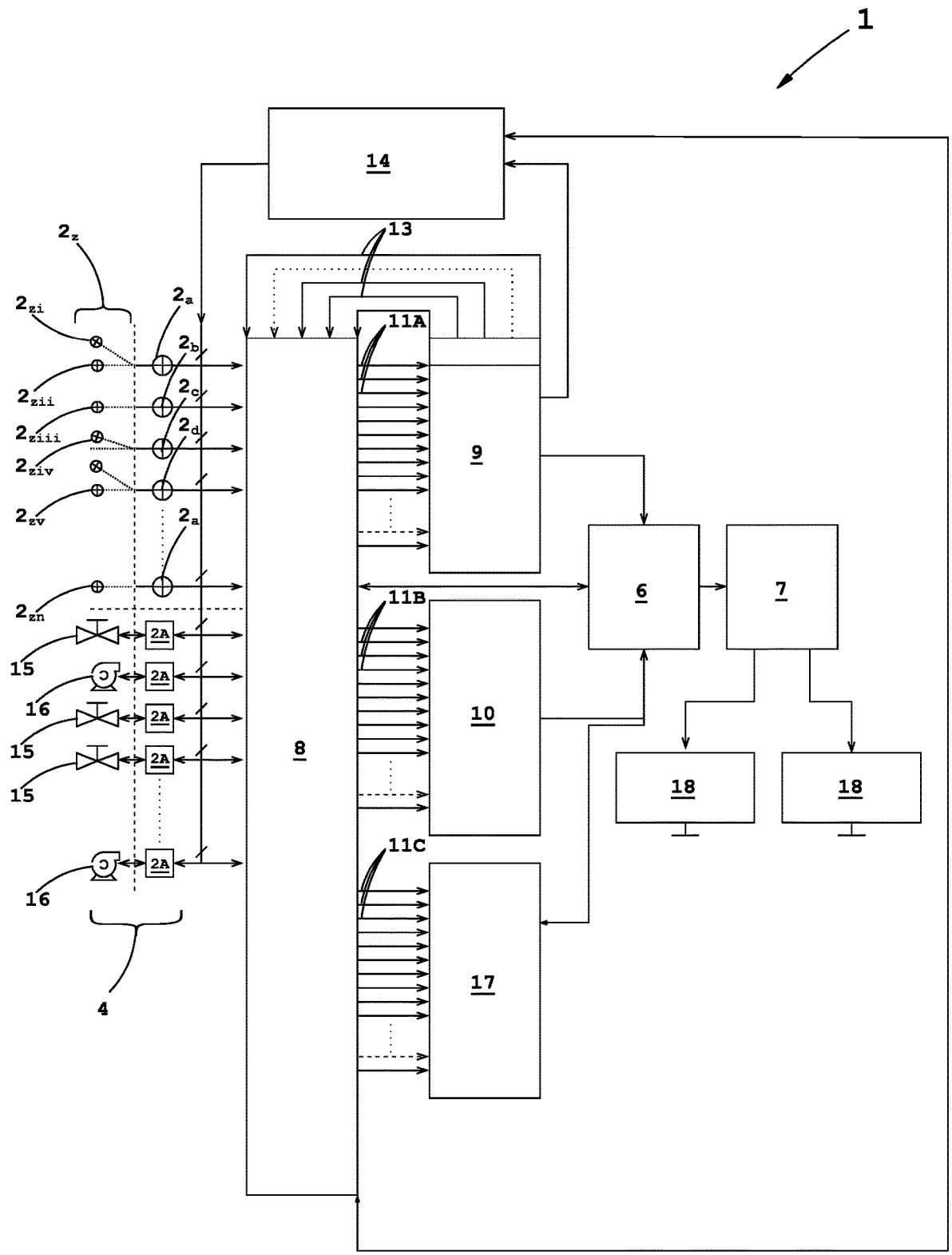
FIG. 2 is a schematic representation of a system for monitoring and controlling a dynamic network.

As shown in FIG. 2, system 1 also receives information from actuated sensors 2A which measure the state of an actuator, shown in this example as valves 15 and pumps 16, which acts upon the network such that the state estimation and predictive control model 9 learns the effect of the state of the actuator 2A on the state of the network. This also allows the network to be controlled by the system 1, based on the learned effects of the operational state of the actuators and estimated effect in order to reach a desired state of the network 4.

System 1 includes a network topology processor 6 for storing the topology of the network 4 and relating virtual sensors 2, and the relevant positions of transducers $2_z$ within the segment, to segments 3 of the network 4 and neighboring sensors 2 in accordance with the topology. The topology processor 6 has the ability to change with the dynamics of the networked system 1 as the topology processor 6 computes the modified network 4 relationships in real time. The network topology processor 6 computes boundaries and divides the network 4 into segments 3 and determines parameters of the segment 3 such as interconnections, length, number, and type of sensors 2 which exhibit similar observable behavior. The division of network into segments are dynamically computed on the basis of network 4 topology, interconnections, and length of the specific section. This also allows changes to the network to be detected. The network topology processor 6 stores the topology of the network as a graph. The graph may include vertices, which represent nodes of the network, and edges, representing sections of the network. The graph may be stored by the processor in the form of an adjacency matrix. The topology processor may include a geographical relation element 7 which relates the nodes and vertices of the network 4, as stored by the topology processor 6 to a physical location thereof. The physical location will typically include geographic coordinates. The topology processor 6 and geographical relation element 7 correlate data structures that hold the spatial data, connectivity, real-time data, computed state space and model information of the network.

System 1 includes a central controller 8 which receives the measurements from the virtual sensors 2, stores historical measurements and estimated states, and provides values to a state estimation and predictive control model 9 and to a classifier 10. The controller 8 orchestrates messages and transfers data between the various components of the system. In this way, it acts as a message orchestrator for data transfer, integration and processing between the various components. The controller may also be responsible for further preprocessing before the values are provided to the model 9 or the classifier. The controller, along with the topology processor, may use the raw data from the sensors, along with their topological connections and physical locations, to derive preprocessed values which would be observable between neighboring sections. These values may, in addition to normalized measurements, be provided as inputs 11 to the components of the system 1. The model inputs 11A may differ from the classifier inputs 11B and the feature extraction inputs 11C, and the central controller processes the measurements and information provided by the sensors 2 into a usable form for the components (shown in this example as the model 9 and the classifier 10 in FIG. 2).

The state estimation and predictive control model 9 includes a reinforcement learning artificial neural network (ANN) which uses inputs 11 to model the state of the network 4 and estimate sequential states of the network 4. The ANN is a dynamic ANN with dynamically configurable number of layers and neurons per layer which optimized for a specific network 4 and relies on deep learning for training and automatic reconfiguration thereof. As such, the architecture of the network will vary considerably between different implementations. The error between the predicted sequential state and the actual measured state is used as feedback to train the network to reliably estimate the state of the network through reinforcement learning. The predicted values are also fed back into the central controller as inputs 13.

A selective activation element 14, which is a novel concept developed by the inventors, receives information from the central controller 8 and the model 9 and selectively activates and deactivates signals provided to the controller 8 during the learning process. The inventors refer to the selective activation element 14 as an agonist engine, these terms being used interchangeably in this description, because of its similarity to the way a human brain reacts to chemical agonists. The selective activation element 14 includes synapses which encode winning and/or most successful short-term memory activations into long-term memory. The selective activation element 14 is utilized during training of the model to provide or withhold signals such that effective selections, where the estimation error is smallest, are stored such that the effective selections may be made during monitoring and control based thereon.

The inputs 11 may include historical measurements and values such that temporal aspects of the measurements may be trained into the model. The learning of temporal and dynamic aspects of the network 4 is crucial to modeling the behavior of dynamical networks based upon the acquisition of the knowledge of the network 4 and its operational states. A dynamical system transitions through different states and establishes relationships between the participating real-world variables (influencing factors) that are quantifiable and measurable. The relationships can be estimated using the model 9 such that the behavior of the dynamic network 4 may be learned over a period of time to establish the states. This allows the system 1 to extract relationships that are impossible to deduce through flow or energy equations and also to detect and control state changes in real-time without external stimuli or intervention. It also allows monitoring the inherent behavioral characteristics of the dynamic network 4, otherwise not observable or perceivable by humans.

The model 9 learns states of the system 1 from inputs 11 and creates the model 9 of the network 4 around the behavior and inter-relationship of the inputs within a dynamic boundary computed by the system 1. The model 9 differs from deterministic models such as hydraulic models as it does not require energy or flow equations to be solved deterministically. The deep neural network of the model 9 learns the relationships of the inputs presented and creates representation of the various states of operation.

The classifier 10 includes an ANN in the form of a Bayesian neural network for classifying the condition of each section 3 of the network 4. The condition may be steady state, transitioning, or abnormal. The contributing factors of an underlying unique behavior that may cause the network to leave the steady state can be identified using the classifier 10. The classifier may also validate measurements from adjacent sensors and identify faulty readings.

The system 1 also includes a feature extraction element 17. The feature extraction element 17 includes a recurrent neural network with long short-term memory (LSTM) which uses temporal signals to build abstract profiles and extract repeatable phenomenon from the temporal wave behavior, its frequency elements, and ability to propagate in relation to the network 4. This observed phenomena, typically attenuated over distance, may thus be used to automatically construct the topology of the network 4 as unique features are detected as it propagates through the network 4.

The feature extraction element may include a fault detection element which detects faults based on detected temporal features. The fault detection element may include an input LSTM layer, multiple hidden layers, and output layer with softmax activation and detects observable measured events, or features, which are measured at multiple locations which do not fall within the estimated state of the network and classifies the event as a fault. The fault detection element may also detect features which correspond to a predefined fault condition. such as water hammer, leak, and/or implosion in a section of the network. The fault detection element learns and extracts features across time steps in a window to detect faults which have a temporal aspect. The fault detection element may include a geographical locating element, which uses the topological processor and the geographical relation element to locate the origin of a fault in the network 4. The geographical locating element may use the geographical relation element, wave parameters, and triangulation to determine the physical location of the origin of the fault.

Output of the various components of the system 1 may be correlated and displayed on one or more graphical user interfaces 18. The interface 18 shows the sections and nodes of the network 4 schematically or to scale (similar to the network 4 shown in FIG. 1). The graphical interface 18, when displaying the network 4 for monitoring purposes, will indicate selected condition of each segment 3 of the network 4. The condition may be the state, it may indicate conditions such as steady state or transitional states, or detected anomalies, features and faults, all overlaid on the topography as displayed. These indications may be in the form of overlaid values in text, graphs, alerts, or colors associated with the various conditions detected. The graphical interface may also indicate the type and location of a fault which is located based on the relative position of detection of specific features and the distance between detected features based on the network topology 4 and is able to differentiate and visualize segments 3 of the network 4 that exhibit a unique behavior.

The system monitors and controls a dynamic network which enables operators thereof to achieve round-the-clock autonomous monitoring of the entire physical network in a supervised or autonomous fashion. The system improves efficacy of control loops and, through judging on a probable behavior patterns, improves operator visibility and response. The system can accurately determine the incidental operational state and is useful to monitor, assess, and control deviations and maintain stability of the system in an autonomous fashion.

The system further enables reading and interpretation of the information received through re-processing of the various measurements made by all the transducers in near real time so as to constantly control the network, defining a new and innovative methodology of continuous and constant control of fixed structures and, in the specific case of pipeline networks, enabling round-the-clock monitoring thereof. It provides operational intelligence on the state of the entire dynamical system, enabling detection of any alterations thereto and is able to identify possible fault conditions and representing geographically a map of the network with the indications of the fault conditions found.

The deep learning neural network solver of FIG. 1 maintains a dynamic state matrix and adapts to its own context of the segment and control zone in which it operates. The underlying layer feeds in the fundamental features and inputs that collectively represents behavior in the individual control zone. The control zone solvers utilize these underlying features in context to the neighborhood, topological and spatial characteristics to define the model and derive useful correlations that can be utilized by the third and final controller layer to generate actions, predictions and decisions in a reinforcement learning paradigm for system/process control as shown in FIG. 3.

The environment starts from an initial state at step 30 and an action is taken and affects the environment causing the initial state to change or transition in a manner independent of its past history. The changes are influenced by numerous dynamic elements of a network that may or not be directly observable. Hence the problem has a high dimensionality and relationship under partial observability defining a system of sparse states. The measurements are made through virtual smart state sensors or detectors coupled to field sensors or detectors controlled by a data acquisition system in real time. Meaning is derived when the observable states are correlated along the physical inter links. In the present description, by, "state-detectors", or "state-sensors" are to be understood as devices capable of detecting, measuring or discerning multidimensional physical quantities of any type (of fluid flow, pressure, mechanical, chemical nature, etc.) and converting them into a quantity of an appropriate type that can be represented in measurable form for input to an accumulator, comparator or similar measuring, data or memory device.

Figure 3:
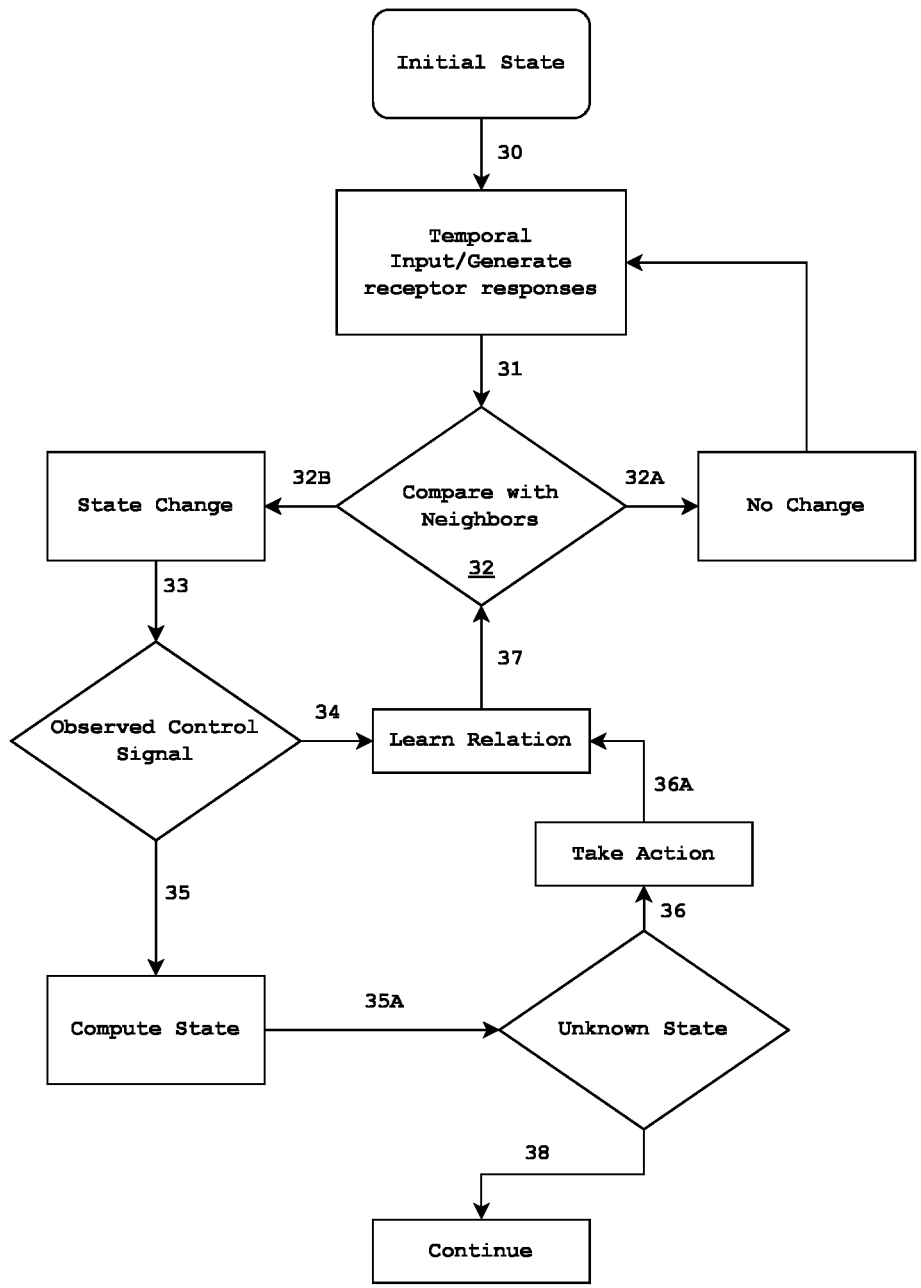
FIG. 3 is a flow chart of the operation of the state or fault detection unit of the network.

As shown in FIG. 3, a temporal receptor generates or inputs a response to the state of the network at 31. Such responses at step 31 are compared with neighboring responses at decision block 32 to determine if there has been a state change. If there is no change, the system loops back at step 32A to continue processing responses at step 31 and comparing at 32 until a state change has been detected. Such a loop is monitoring the state and any state change. If there has been a state change, the processing continues at 32B and at 33 a control signal is observed indicating a state change to determine the learning relation at step 34. The step of relationship learning at 34 provides an input to the comparison step at step 32, and the loop continues as additional responses are received and processed.

The observed control signal at step 33 is computed at step 35 and at step 35A it is determined if the control signal is an unknown state. If the state is unknown at step 36, action is taken at step 36A to loop back to learn the relation and at step 37 is input to compare block 32 to further compare and determine relations with neighbors at steps 32A and 32B. If the state is known, system processing continues at step 38 and the output from the reinforcement learning module is provided to system 1 as an input.

Figure 4:
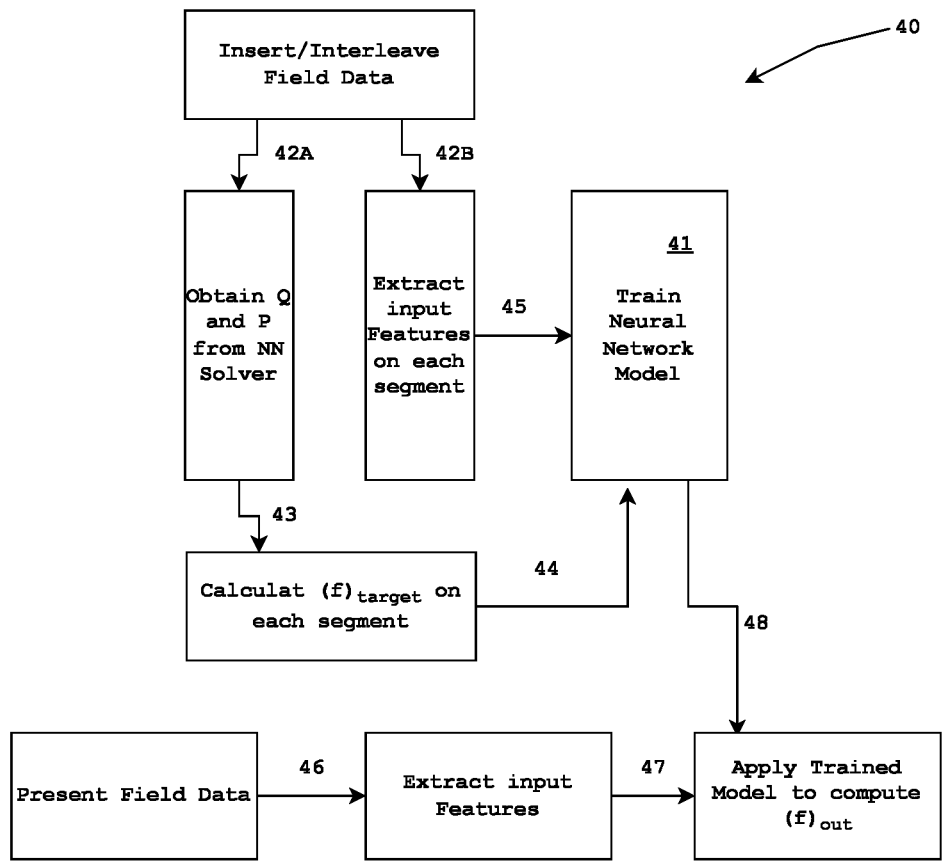
FIG. 4 is a flow chart of the reinforcement learning function of the system including iterative comparison and training.

FIG. 4 illustrates a block diagram of a reinforcement learning system 40 including a trained artificial neural network 41 to detect dynamic events as described above and shown in FIGS. 1, 2 and 3. As shown in FIG. 4, the reinforced learning system 40 and artificial neural network 41 can interact with an environment consisting of pressurized dynamic pipeline network described by a temporal dynamic process with a finite set of states as shown in FIGS. 1 and 3 and described above. It can be seen as a temporal representation of states where it can be collectively observed. The relationship of the observed variables at step 42 is represented in the accumulator and is typically non-linear.

At a particular point in time, the environment is in given state and certain data fields are provided as inputs at steps 42A and 42B. Features of the input data at step 42B are extracted at step 45 and input to neural network 41. Action may be taken which affects the environment causing the state to transition in a manner independent of its past history at step 43. The changes are influenced by numerous dynamic elements of a network that may or not be directly observable at step 44 and input to neural network 41.

Present field data is input at step 46 and certain features of the present filed data are extracted and input at step 47. The input at step 47 is combined with the output from the neural network 41 at step 48. The combination of the extracted input from the present filed data and the output from the trained neural network 41 apply the trained model to compute the accurate incidental operational state and assist in monitoring, accessing and controlling deviations and maintain stability of the system.

The measurements are made through virtual smart state detectors coupled to the field sensors controlled by the data acquisition system in real time as described in detail above with respect to FIGS. 1 and 2. Meaning is derived when the observable states are correlated along physical inter links by virtual sensors 2, as shown in FIG. 1. In the present description, "detectors," "state-detectors," "sensors," and "state-sensors" are to be understood as devices capable of detecting multidimensional physical quantities of any type (of fluid flow, pressure, mechanical, chemical nature, etc.) and of converting them into a quantity of an appropriate type that can be represented in an accumulator.

By interpreting the measurements, obtained using the various state-sensors, the state of normal operation of the pipeline network is determined, as well as any possible changes or alterations thereof. These measurements identify and learn any state changes ranging from static to dynamic changes. Also to detect state changes to transient states that prevent the pipeline system to return back to normal state of operation and that might jeopardize proper operation and integrity thereof. The system further comprises the capability to determine the dynamic boundaries established on a segment when physical alterations occur (such as damage or breakage). Such changes induces differences in the propagated waves that are then perceived, measured and detected by the system as diverging away from the cause of such event thereby helping in triangulating and locating the origin on the pipeline/structure.

In an advantageous embodiment of the invention, water/gas leaks on large, interconnected pipe networks can be detected as changes in the states can be determined and localized to virtual zones.

The present invention has the ability to adapt to the dynamics of the networked system as the topology processor computes the modified network relationships in real time. Network configuration changes can be automatically detected. The supervisory engine queries the topology processor to obtain physical relationship of the observed elements of the network and correlates the data acquired through the state-sensors and behavioral models to adapt its internal structure automatically.

The invention is not limited to the precise details as described herein. For example, instead of using an LSTM ANN to process temporal data, another ANN with a suitable topology for processing temporal signals, such as a recurrent neural network with some form of temporal signal processing, may be employed. Further, instead of the system being used to monitor and control a pipeline, the system may be used to control any physical dynamic system such as a power grid or traffic network.

Reference throughout this specification to "the embodiment," "this embodiment," "the previous embodiment," "one embodiment," "an embodiment," "a preferred embodiment" "another preferred embodiment" or similar language means that a particular feature, structure, or characteristic described in connection with the embodiment is included in at least one embodiment of the present invention. Thus, appearances of the phrases "in the embodiment, "in this embodiment," "in the previous embodiment, in one embodiment, in an embodiment," "in a preferred embodiment," "in another preferred embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. While the present invention has been described in connection with certain exemplary or specific embodiments, it is to be understood that the invention is not limited to the disclosed embodiments, but, on the contrary, is intended to cover various modifications, alternatives, modifications and equivalent arrangement as will be apparent to those skilled in the art. Any such changes, modifications, alternative, equivalents and the like may be made without departing from the spirit and scope of the disclosure.

The invention claimed is:

1. A system for monitoring and controlling a dynamic network comprising:
   a plurality of sensors for measuring aspects of a state of the network; each of the plurality of sensors being associated with a segment of the network and connected to a virtual sensor which accumulates and preprocesses measurements from the sensors for each segment of the network;
   a network topology storing the topology of the network and relating sensors and virtual sensors to segments of the network and neighboring sensors and virtual sensors in accordance with the topology;
   a reinforcement learning artificial neural network (RL-ANN) based nonlinear state estimation and predictive control model with measurements from the sensors and virtual sensors to model the state of the network and estimate sequential states of the network;
   a classifier for classifying conditions of the segments of the network such that the condition of each segment may be monitored;
   wherein preceding measurements from the sensors are temporarily stored and provided to the state estimation and predictive control model as inputs for modeling and estimating sequential states of the network;
   wherein the ANN uses reinforcement learning to train the artificial neural network based on the difference between the estimated state and the measured state;
   wherein the system includes a selective activation element which selectively provides and or withholds signals during the learning process; and
   wherein selective activation element is utilized during training of the model to provide or withhold signals such that effective selections, where estimation error is smallest, are stored such that effective selections may be based on the stored values.

2. A system for monitoring and controlling a dynamic network comprising:
   a plurality of sensors for measuring aspects of a state of the network;
   each of the plurality of sensors being associated with a segment of the network and connected to a virtual sensor which accumulates and preprocesses measurements from the sensors for each segment of the network;
   a network topology processor for storing the topology of the network and relating sensors and virtual sensors to segments of the network and neighboring sensors and virtual sensors in accordance with the topology
   a reinforcement learning artificial neural network (RL-ANN) based nonlinear state estimation and predictive control model which uses measurements from the sensors and virtual sensors to model the state of the network and estimate sequential states of the network;
   a classifier for classifying conditions of the segments of the network such that the condition of each segment may be monitored;

wherein preceding measurements from the sensors are temporarily stored and provided to the state estimation and predictive control model as inputs for modeling and estimating sequential states of the network;

wherein the ANN uses reinforcement learning to train the artificial neural network based on the difference between the estimated state and the measured state;

wherein the system includes a selective activation element which selectively provides and or withholds signals during the learning process; and wherein the selective activation element includes at least one synapse which encodes winning short-term memory activations into long-term memory.

3. The system of claim 2 wherein the virtual sensors observe, identify, and learn inter-relationships of the measurements from the sensors of the segment which collectively represent a dynamic state of the network segment and behavior of the relevant segment.

4. The system of claim 2 wherein the virtual sensors receive and process temporal physical measurements from the sensors such as pressure, flow, temperature, and computes derived measurements such as signal frequency, wavelength, autocorrelation, and signal mode.

5. The system of claim 2 wherein network topology processor computes boundaries, divides the network into segments, and determines parameters of the segment.

6. The system of claim 5 wherein the parameters include interconnections, length, number, and type of sensors which exhibit similar observable behavior.

7. The system of claim 2 wherein the ANN is a dynamic ANN with dynamically configurable number of layers and neurons per layer.

8. The system of claim 2 wherein the sensors include actuated sensors which measure the state of an actuator which acts upon the system such that the state estimation and predictive control model learns the effect of the state of the actuator on the state of the network.

9. The system of claim 2 wherein actuators are controlled by the system and control of an actuator is based on the estimated states of the network by the state estimation and predictive control model and the desired state of the network.

10. The system of claim 2 or claim 9 wherein the system includes a feature extraction element in the form of a recurrent neural network with memory, which uses temporal signals to build abstract profiles and extract repeatable phenomenon from the temporal wave behavior, its frequency elements and ability to propagate.

11. The system of claim 2 wherein the system includes one or more preprocessing elements for preprocessing any measurements from virtual sensors for use by the active elements of the state estimation and predictive control model.

12. The system of claim 11 wherein the network topology processor may normalize the measurements of virtual sensors, extract features from measurements and derived measurements, classify the extracted features which is provided to the state estimation model, and apply filters to the measurements to provide preprocessed values to the state estimation and predictive control model.

13. The system of claim 2 wherein the classifier includes a Bayesian neural network for classifying the condition of each portion of the network.

14. The system of claim 13 wherein the condition may be steady state, transitioning, or abnormal.

15. The system of claim 2 wherein the classifier validates measurements from adjacent sensors to identify faulty readings.

16. The system of claim 2 wherein the state estimation and predictive control model includes an anomaly detection element.

17. The system of claim 16 wherein the anomaly detection element detects measurements or derived measurements which fall outside of the estimated state of the network.

18. The system of claim 2 wherein the system includes a central controller which receives the measurements from the virtual sensors, stores historical measurements and estimated states, and provides measurements to the classifier and the state estimation and predictive control model.

19. The system of claim 2 wherein the network topology processor stores the topology of the network as a graph.

20. The system of claim 19 wherein the topology processor includes a geographical relation element which relates the nodes and vertices of the network to a physical location thereof.

21. The system of claim 2 wherein the graph includes vertices, which represent nodes of the network, and edges, representing sections of the network.

22. The system of claim 2 wherein the topology and geographical relation element correlate data structures that hold the spatial data, connectivity, real-time data, computed state space and model information of the network.

23. The system of claim 2 wherein the system includes a fault detection element.

24. The system of claim 23 wherein the fault detection element includes a geographical locating element, which uses the topological processor and the geographical relation element to locate the origin of the fault in the network.

25. The system of claim 24 wherein the geographical locating element uses the geographical relation element, wave parameters, and triangulation to determine the physical location of the origin of the fault.

26. The system of claim 23 wherein the fault detection element detects observable measured events which are measured at multiple locations which do not fall within the estimated state of the network and classifies the event as a fault.

27. The system of claim 23 wherein the fault detection element detect measurements which correspond to a predefined fault condition.

28. The system of claim 27 wherein the predefined fault condition includes water hammer, leak, and implosion in a section of the network.

29. The system of claim 23 wherein the fault detection element includes a feature extraction element and a classifier.

30. The system of claim 29 wherein the fault detection element includes a memory (LSTM) ANN which learns and extracts features across time steps in a window to detect faults which have a temporal aspect.

31. The system of claim 29 wherein the fault detection element includes an input LSTM layer, multiple hidden layers, and output layer with softmax activation.

32. The system of claim 2 wherein the system includes a graphical interface which shows the sections and nodes of the network.

33. The system of claim 32 wherein an actuator is a pump and the sensor measures the operational level of the pump.

34. The system of claim 32 wherein the graphical interface indicates the type and location of a fault.

35. The system of claim 32 wherein the sections and nodes are shown schematically.

36. The system of claim 32 wherein the sections and nodes are shown to scale.

37. The system of claim 32 wherein the graphical interface indicates the condition of each section of the network.

38. The system of claim 2 wherein the network is a pipeline network.

39. The system of claim 38 wherein an actuator is a valve and the sensor measures the operational position of the valve.

40. The system of claim 38 wherein the network is a water reticulation network.

41. The system of claim 38 wherein the sensors include flow sensors, pressure sensors, temperature sensors, acoustic sensors, vibration sensors, turbidity sensors, pH sensors, Oxidation Reduction Potential (ORP) sensors, and chlorine sensors.

* * * * *